United States Patent
Murayama

(10) Patent No.: US 9,463,838 B2
(45) Date of Patent: Oct. 11, 2016

(54) STRADDLE-TYPE VEHICLE

(71) Applicant: YAMAHA HATSUDOKI KABUSHIKI KAISHA, Iwata-shi, Shizuoka (JP)

(72) Inventor: Yuki Murayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 59 days.

(21) Appl. No.: 14/202,269

(22) Filed: Mar. 10, 2014

(65) Prior Publication Data

US 2014/0265229 A1 Sep. 18, 2014

(30) Foreign Application Priority Data

Mar. 15, 2013 (JP) .................. 2013-053859

(51) Int. Cl.
*B62K 11/00* (2006.01)
*B62K 11/04* (2006.01)
*B62J 37/00* (2006.01)

(52) U.S. Cl.
CPC ................ *B62K 11/04* (2013.01); *B62J 37/00* (2013.01)

(58) Field of Classification Search
CPC ..................................................... B62K 11/04
USPC ........................................................ 180/228
See application file for complete search history.

(56) References Cited

U.S. PATENT DOCUMENTS

| | | | | |
|---|---|---|---|---|
| 4,207,960 A * | 6/1980 | Hashimoto | ................... | 180/228 |
| 4,412,597 A | 11/1983 | Aiba | | |
| 4,487,285 A * | 12/1984 | Tomita et al. | ................ | 180/228 |
| 4,660,854 A * | 4/1987 | Suzuki et al. | ................ | 280/782 |
| 4,836,324 A * | 6/1989 | Morita et al. | ................ | 180/291 |
| 5,390,758 A * | 2/1995 | Hunter et al. | ................ | 180/228 |
| 5,845,728 A * | 12/1998 | Itoh et al. | ................ | 180/219 |
| 5,921,339 A * | 7/1999 | Matsuura | ................ | 180/219 |
| 2005/0218290 A1* | 10/2005 | Muramatsu | ................ | 248/674 |
| 2006/0169511 A1 | 8/2006 | Kurokawa et al. | | |
| 2008/0223648 A1* | 9/2008 | Shiraishi | ................ | 180/312 |
| 2012/0125284 A1* | 5/2012 | Brace et al. | ................ | 123/195 R |
| 2012/0205179 A1* | 8/2012 | Toda et al. | ................ | 180/312 |
| 2012/0318598 A1* | 12/2012 | Fujiyama et al. | ................ | 180/219 |

FOREIGN PATENT DOCUMENTS

| | | |
|---|---|---|
| JP | 59-21997 Y2 | 6/1984 |
| JP | 60-20229 B2 | 5/1985 |
| JP | 4546312 B2 | 9/2010 |

* cited by examiner

*Primary Examiner* — Joseph Rocca
*Assistant Examiner* — Conan Duda
(74) *Attorney, Agent, or Firm* — Keating and Bennett, LLP

(57) ABSTRACT

A straddle-type vehicle includes a bracket including a first attachment portion, a second attachment portion and a coupling portion. The first attachment portion is attached to a down frame. The second attachment portion is attached to an engine and is located rearward of the first attachment portion. The coupling portion is located between the first and second attachment portions and couples the first attachment portion with the second attachment portion. The first and second attachment portions extend in the front-to-rear direction. The first attachment portion is offset relative to the second attachment portion in a vehicle width direction. In a plan view of the vehicle, the coupling portion is oriented in or substantially in a front-to-rear direction with respect to the vehicle and extends in a direction different from that of the first and second attachment portions.

13 Claims, 9 Drawing Sheets

STRADDLE-TYPE VEHICLE

BACKGROUND OF THE INVENTION

1. Field of the Invention

The present invention relates to straddle-type vehicles, and more particularly, to a bracket that couples a down frame with an engine.

2. Description of the Related Art

Straddle-type vehicles include motorcycles, for example. Motorcycles are disclosed in Japanese Patent No. 4546312, for example.

According to Japanese Patent No. 4546312, a motorcycle includes an engine, a frame, and a plurality of engine brackets. The frame includes a head pipe, a main frame, a down frame, a lower frame, and a pivot frame. The main frame extends rearward from the head pipe. The down frame extends downward from the bottom of the head pipe. The lower frame extends rearward from the bottom of the down frame. The pivot frame couples a rear portion of the lower frame with a rear portion of the main frame. The engine is supported on the frame via the plurality of engine brackets. The plurality of engine brackets include a first engine brake, a second engine bracket and a third engine bracket. The first engine bracket connects the pivot frame with the cylinder head of the engine. The second engine bracket connects the top end of the lower frame with the crankcase of the engine. The third engine bracket connects the portion of the lower frame that is in its middle as measured in a front-to-rear direction thereof, with the crankcase.

A motorcycle may travel over an uneven surface. At this moment, the engine bracket coupling the frame located forward of the engine with the engine (hereinafter referred to as front engine bracket) receives an impact-related load in a front-to-rear direction with respect to the vehicle. To address such a load, it is desirable to reduce the rigidity of the bracket to absorb the impact.

When the motorcycle is cornering, the vehicle, even when leaned, tends to rise up due to centrifugal forces and the rigidity balance of various components. At this moment, the front engine bracket receives a twisting load in a twisting direction. To address such a load in a twisting direction, it is desirable to ensure a high rigidity of the bracket to prevent the engine from rising up due to centrifugal forces.

Thus, the front engine bracket is desired to possess different properties associated with a front-to-rear direction with respect to the vehicle and a twisting direction. The bracket is desired to possess these properties at the same time. Japanese Patent No. 4546312 fails to disclose or suggest the properties that the front engine bracket is desired to possess.

SUMMARY OF THE INVENTION

Preferred embodiments of the present invention provide a straddle-type vehicle that possesses desirable properties associated with a front-to-rear direction with respect to the vehicle and a twisting direction at the same time.

A straddle-type vehicle according to a first preferred embodiment of the present invention includes an engine, a body frame, and a bracket. The bracket attaches the engine to the body frame. The body frame includes a head pipe, a main frame, and a down frame. The main frame extends rearward from the head pipe. The down frame is located forward of the engine and extends in a top-to-bottom direction. The bracket includes a first attachment portion, a second attachment portion and a coupling portion. The first attachment portion is attached to the down frame. The second attachment portion is attached to the engine and is located rearward of the first attachment portion. The coupling portion is located between the first and second attachment portions and couples the first attachment portion with the second attachment portion. The first and second attachment portions extend in a front-to-rear direction with respect to the vehicle. The first attachment portion is offset relative to the second attachment portion in a vehicle width direction. In a plan view of the vehicle, the coupling portion is generally oriented in a front-to-rear direction with respect to the vehicle and extends in a direction different from that of the first and second attachment portions.

In the first preferred embodiment of the present invention, the first and second attachment portions are offset relative to each other in a vehicle width direction. Thus, the rigidity of the bracket in a front-to-rear direction with respect to the vehicle is reduced. As such, for example, an impact load in a front-to-rear direction with respect to the vehicle received when the vehicle travels over an uneven surface is mitigated. On the other hand, the rigidity of the bracket in a direction in which one of the first and second attachment portions is twisted relative to the other is increased. As such, the engine is stably supported against a twisting load received during cornering, for example. Thus, the bracket possesses the desired properties associated with a front-to-rear direction with respect to the vehicle and a twisting direction at the same time.

The main frame need not extend directly from the head pipe rearward. For example, the main frame may extend rearward from another component connected with the head pipe (a connecting frame that couples the head pipe with the down frame, for example).

It is not necessary that the entire down frame be located forward of the engine. That is, the down frame includes a frame that has only a portion thereof located forward of the engine.

A second preferred embodiment of the present invention includes the arrangement of the first preferred embodiment of the present invention, and, in a plan view of the vehicle, the coupling portion extends in a direction angled relative to a front-to-rear direction with respect to the vehicle.

In the second preferred embodiment of the present invention, the thickness of the coupling portion preferably is smaller than that of a coupling portion extending in a vehicle width direction. As such, the rigidity of the bracket is capable of being easily tuned.

A third preferred embodiment of the present invention includes the arrangement of the second preferred embodiment of the present invention, and the first attachment portion, second attachment portion and coupling portion each have a thickness as measured in a vehicle width direction. The coupling portion includes a first end surface and a second end surface. The first end surface is located on one of the sides of the coupling portion disposed in a vehicle width direction. The second end surface is located on the other one of the sides of the coupling portion disposed in a vehicle width direction. In a plan view of the vehicle, the first end surface extends in a direction different from that of the second end surface.

In the third preferred embodiment of the present invention, the thickness of the coupling portion as measured in a vehicle width direction is easily changed along a front-to-rear direction with respect to the vehicle.

A fourth preferred embodiment of the present invention includes the arrangement of the third preferred embodiment of the present invention, and in a plan view of the vehicle, the first end surface includes a slope extending in a direction angled relative to a front-to-rear direction with respect to the vehicle. In a plan view of the vehicle, the second end surface includes a horizontal surface extending in a front-to-rear direction with respect to the vehicle. The slope overlaps the horizontal surface as viewed in a vehicle width direction.

In the fourth preferred embodiment of the present invention, the thickness of the coupling portion as measured in a vehicle width direction is easily changed.

A fifth preferred embodiment of the present invention includes the fourth aspect, and the coupling portion includes a front end and a rear end. The front end is connected with the first attachment portion. The rear end is connected with the second attachment portion. The horizontal surface is formed on at least one of the front and rear ends.

In the fifth preferred embodiment of the present invention, the horizontal surface is easily provided.

A sixth preferred embodiment of the present invention includes the arrangement of the third through fifth preferred embodiments of the present invention, and the coupling portion includes a portion that has a thickness as measured in a vehicle width direction that is smaller than that of the first and second attachment portions.

In the sixth preferred embodiment of the present invention, the rigidity of the bracket is easily reduced.

A seventh preferred embodiment of the present invention includes the arrangement of any of the first through sixth preferred embodiments of the present invention, and the first attachment portion includes a first joining surface. The first joining surface overlaps the down frame such that the joining surface and the down frame are arranged in a vehicle width direction, and is joined to the down frame. The second attachment portion includes an end surface and a projection. The end surface is located outward of the first joining surface as measured in a vehicle width direction. The projection protrudes from the end surface inward as measured in a vehicle width direction. The projection overlaps the engine such that the projection and the engine are arranged in a vehicle width direction, and is joined to the engine.

In the seventh preferred embodiment of the present invention, the design of the engine need not be changed in order to tune the rigidity of the bracket against a received load. Moreover, the thickness of the second attachment portion as measured in a vehicle width direction is substantially increased, thus increasing the rigidity thereof against an impact load in a vehicle width direction received when the vehicle travels over an uneven surface.

An eighth preferred embodiment of the present invention includes the arrangement of any of the first through seventh preferred embodiments of the present invention, and the engine includes a crankcase. The second attachment portion is attached to the crankcase.

In the eighth preferred embodiment of the present invention, the bracket is located lower than the center of gravity of the engine. Thus, when the vehicle receives a force in a front-to-rear direction with respect to the vehicle, deformation in a twisting direction occurs between the center of gravity and the bracket (more particularly, the portion of the engine to which the second attachment portion is attached). As such, the rigidity of the vehicle as a whole against a received force in a front-to-rear direction with respect to the vehicle is reduced.

A ninth preferred embodiment of the present invention includes the arrangement of the eighth preferred embodiment of the present invention, and in a side view of the vehicle, the second attachment portion is located below a horizontal line that passes through the center of gravity of the engine.

In the ninth preferred embodiment of the present invention, the rigidity of the vehicle as a whole against a received force in a front-to-rear direction with respect to the vehicle is reduced.

A tenth preferred embodiment of the present invention includes the arrangement of any of the first through ninth preferred embodiments of the present invention, and in a side view of the vehicle, the coupling portion is located between the engine and the down frame. A plurality of first insertion holes are provided in the first attachment portion, a bolt being inserted through each of the plurality of first insertion holes to attach the first attachment portion to the down frame. A second insertion hole is provided in the second attachment portion, a bolt being inserted through the second insertion hole to attach the second attachment portion to the engine. The plurality of first insertion holes are arranged in a top-to-bottom direction. In a side view of the vehicle, the second insertion hole is located, as measured in a top-to-bottom direction with respect to the vehicle, between the uppermost one of the plurality of first insertion holes and the lowermost one of the plurality of first insertion holes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Now, a straddle-type vehicle according to preferred embodiments of the present invention will be described with reference to the drawings. In the description of the present preferred embodiments, the straddle-type vehicle preferably is a motocrosser-type motorcycle, for example. The same or corresponding elements in various drawings are labeled with the same characters and their description will not be repeated.

Figure 1:
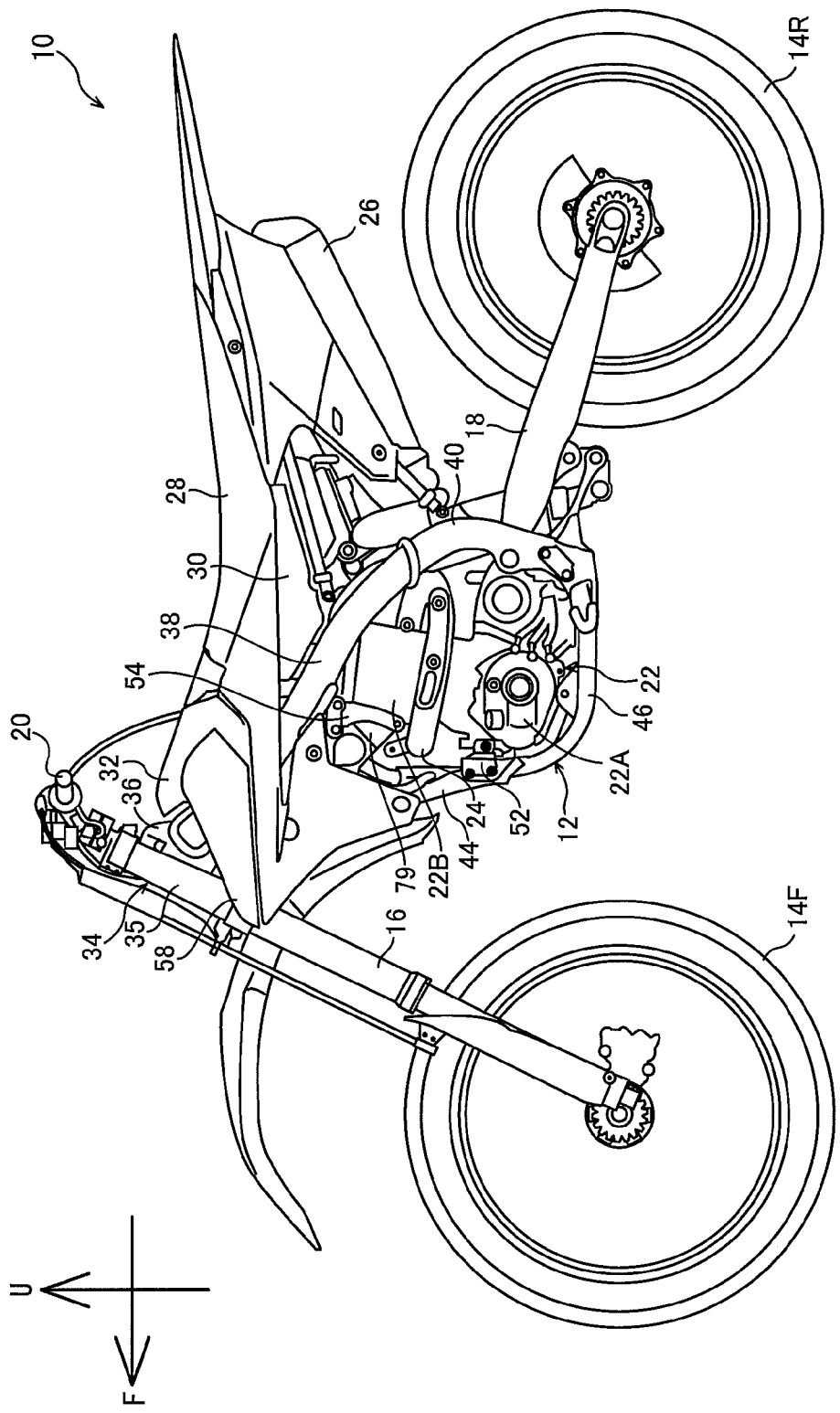
FIG. 1 is a left side view of a motorcycle according to a preferred embodiment of the present invention.

FIG. 1 is a left side view of a motorcycle 10 according to the present preferred embodiment of the present invention. In the following description, front/forward, rear/rearward, left and right indicate directions as perceived by a rider sitting on the seat 28 of the motorcycle 10. In FIG. 1, arrow F indicates the forward direction with respect to the motorcycle 10, and arrow U the upward direction with respect to the motorcycle 10.

The motorcycle 10 includes a body frame 12, a front wheel 14F, a rear wheel 14R, a front suspension 16, a rear arm 18, handlebars 20, an engine 22, an exhaust pipe 24, a muffler 26, a seat 28, a fuel tank 30, and an air cleaner box 32.

Figure 2A:
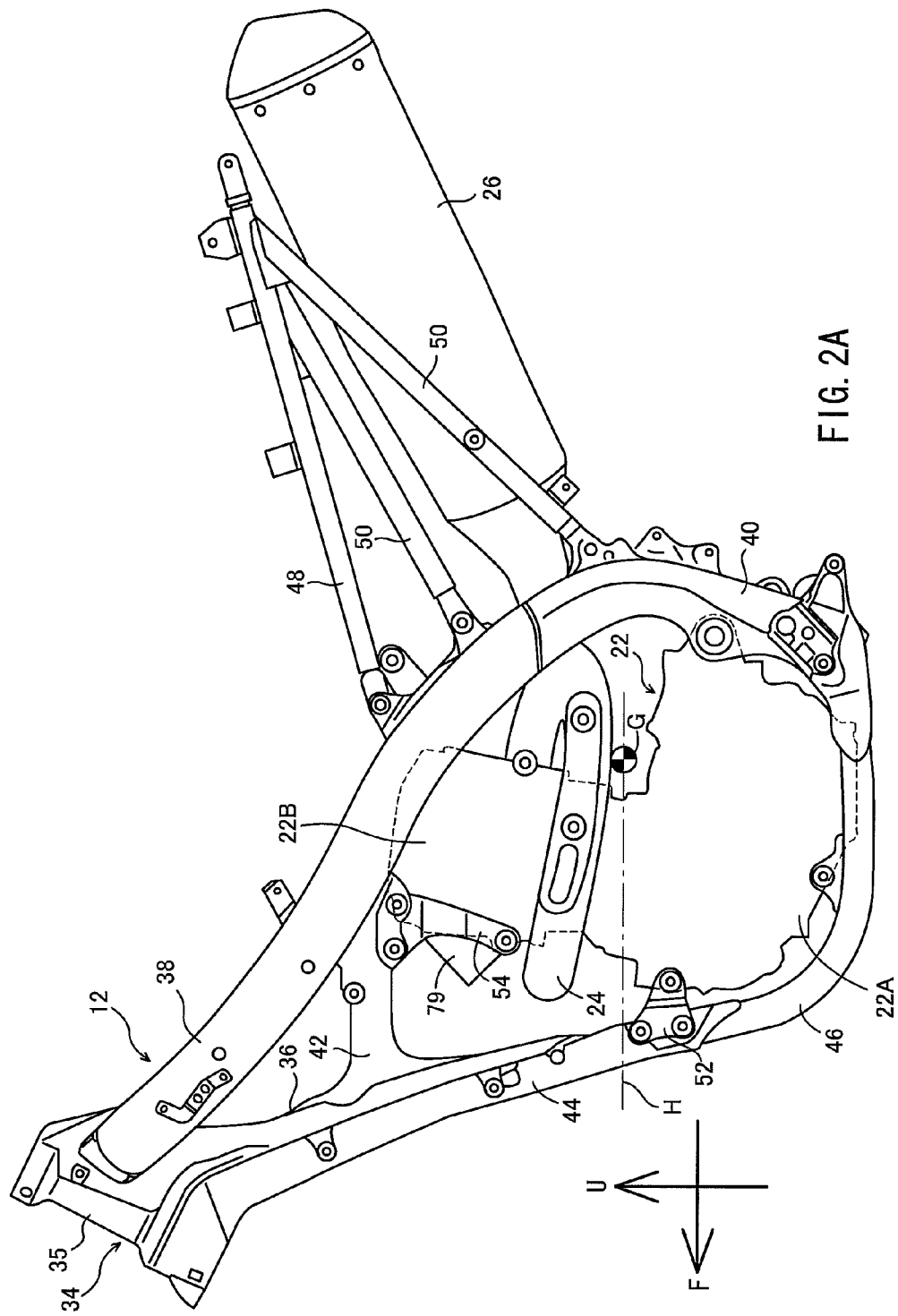
FIG. 2A is a left side view of the body frame.
Figure 2B:
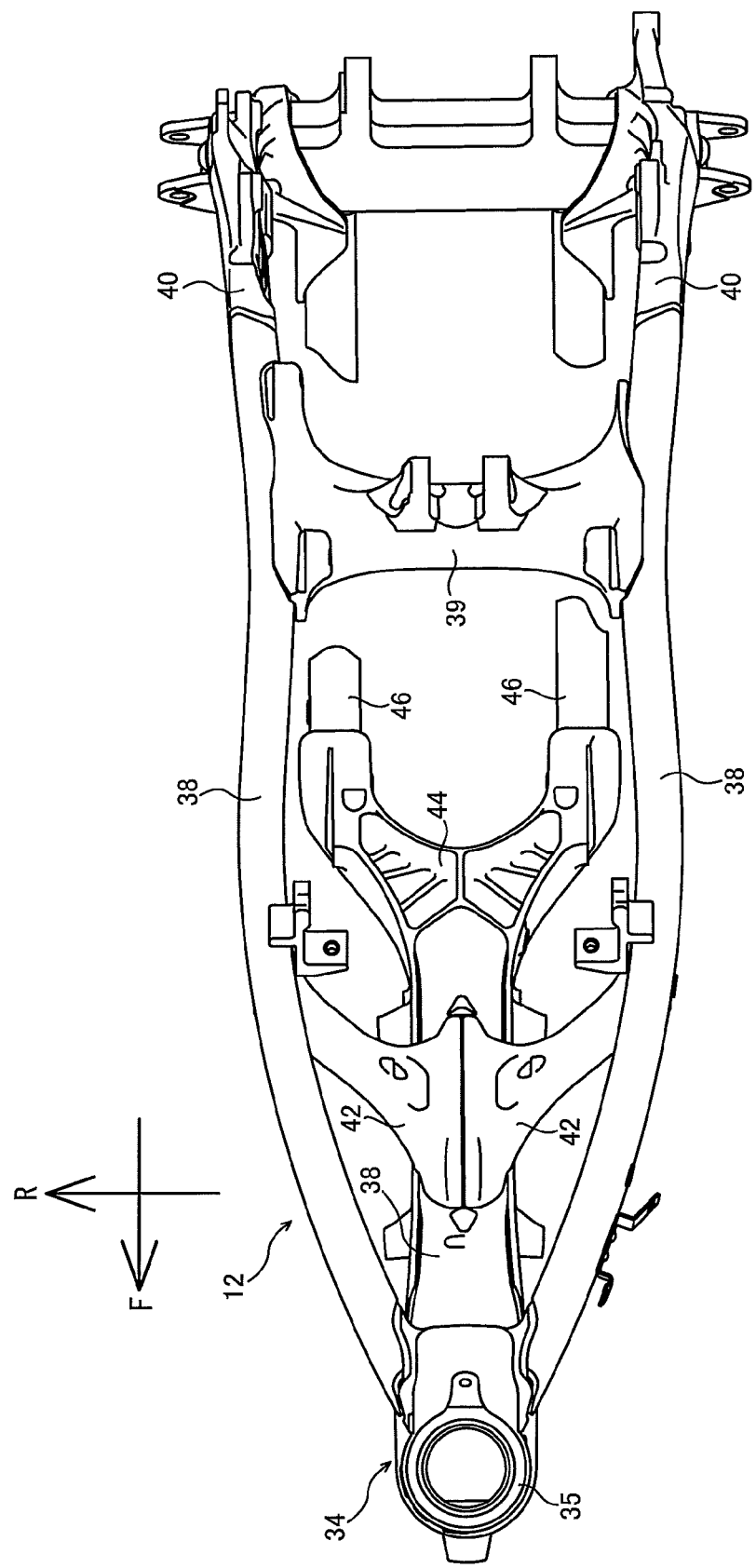
FIG. 2B is a plan view of the body frame.

The body frame 12 will be described with reference to FIGS. 2A and 2B. FIG. 2A is a left side view of the body frame 12. FIG. 2B is a plan view of the body frame. In FIG. 2A, arrow F indicates the forward direction with respect to the motorcycle 10, and arrow U the upward direction with respect to the motorcycle 10. In FIG. 2B, arrow F indicates the forward direction with respect to the motorcycle 10, and arrow L the left direction with respect to the motorcycle 10.

The body frame 12 includes a head pipe 34, a pair of main frames 38, to the left and right, a pair of pivot frames 40, to the left and right, a pair of support frames 42, to the left and right, a down frame 44, a pair of lower frames 46, to the left and right, a pair of seat frames 48, to the left and right, and a pair of back stays 50, to the left and right.

The head pipe 34 is located on the front end of the body frame 12. The head pipe 34 includes a head pipe body 35 and a connecting frame 36. A steering shaft, not shown, is inserted through the head pipe body 35. The connecting frame 36 extends from the head pipe body 35 rearward and downward.

The main frames 38 are connected with the connecting frame 36. The main frames 38 are spaced apart from each other in a vehicle width direction. The main frames 38 extend from the connecting frame 36 rearward and downward. That is, the main frames 38 extend rearward from the head pipe 34.

As shown in FIG. 2B, a cross member 39 is located between the main frames 38. The cross member 39 couples the main frames 38 with each other.

The down frame 44 is connected with the bottom end of the head pipe body 35. The down frame 44 extends rearward and downward from the bottom end of the head pipe body 35. The down frame 44 is connected with the connecting frame 36. That is, the connecting frame 36 couples the head pipe 34 with the down frame 44.

The lower frames 46 are connected with the down frame 44. The lower frames 46 are spaced apart from each other in a vehicle width direction. The lower frames 46 extend rearward and downward from the down frame 44.

The pivot frames 40 are spaced apart from each other in a vehicle width direction. The left pivot frame 40 couples the left main frame 38 with the left lower frame 46. The right pivot frame 40 couples the right main frame 38 with the right lower frame 46.

The support frames 42 are spaced apart from each other in a vehicle width direction. The left support frame 42 couples the connecting frame 36 with the left main frame 38. The right support frame 42 couples the connecting frame 36 with the right main frame 38.

The seat frames 48 are spaced apart from each other in a vehicle width direction. The left seat frame 48 is connected with the cross member 39 and extends from the cross member 39 rearward and upward. The right seat frame 48 is connected with the cross member 39 and extends from the cross member 39 rearward and upward.

The back stays 50 are spaced apart from each other in a vehicle width direction. The left back stay 50 couples the left seat frame 48 with the left pivot frame 40. The right back stay 50 couples the right seat frame 48 with the cross member 39.

Returning to FIG. 1, the front wheel 14F is rotatably supported by the front suspension 16. The front wheel 14F rotates to the left and right as the handlebars 20 are operated. Meters (not shown) are located near the handlebars 20.

The rear wheel 14R is rotatably supported by the rear arm 18 attached to the pivot frames 40. The rear wheel 14R rotates as power from the engine 22 is transferred thereto.

The engine 22 is supported by the body frame 12. More specifically, as shown in FIGS. 1 and 2, the engine 22 is attached to the body frame 12 by a plurality of brackets 52 and 54. More specifically, the crankcase 22A of the engine 22 is attached to the down frame 44 by a pair of brackets 52, to the left and right. The cylinder 22B of the engine 22 is attached to the support frames 42 by a pair of brackets 54, to the left and right. A lower portion of the crankcase 22A is attached to the lower frames 46, and a rear portion of the crankcase 22A is attached to the pivot frames 40.

As shown in FIG. 1, the exhaust pipe 24 is connected with the engine 22. The exhaust pipe 24 extends from an exhaust port provided on the rear side of the cylinder 22B to surround the cylinder 22B. The muffler 26 is connected with the downstream end of the exhaust pipe 24.

The seat 28 is attached to the seat frames 48. The fuel tank 30 is attached to the main frames 38 and seat frames 48. The air cleaner box 32 is attached to the connecting frame 36 and the main frames 38. A pair of air intake ducts 58 are connected with the air cleaner box 32.

Figure 3:
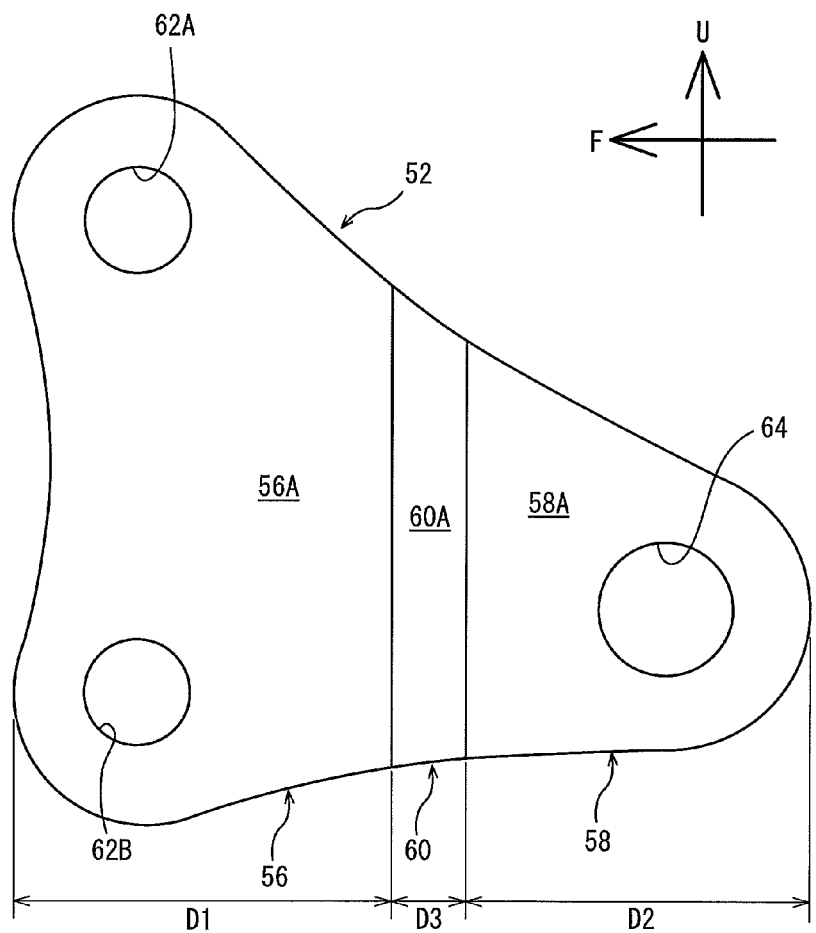
FIG. 3 is a left side view of the left one of a pair of brackets for coupling the down frame with the engine.
Figure 4:
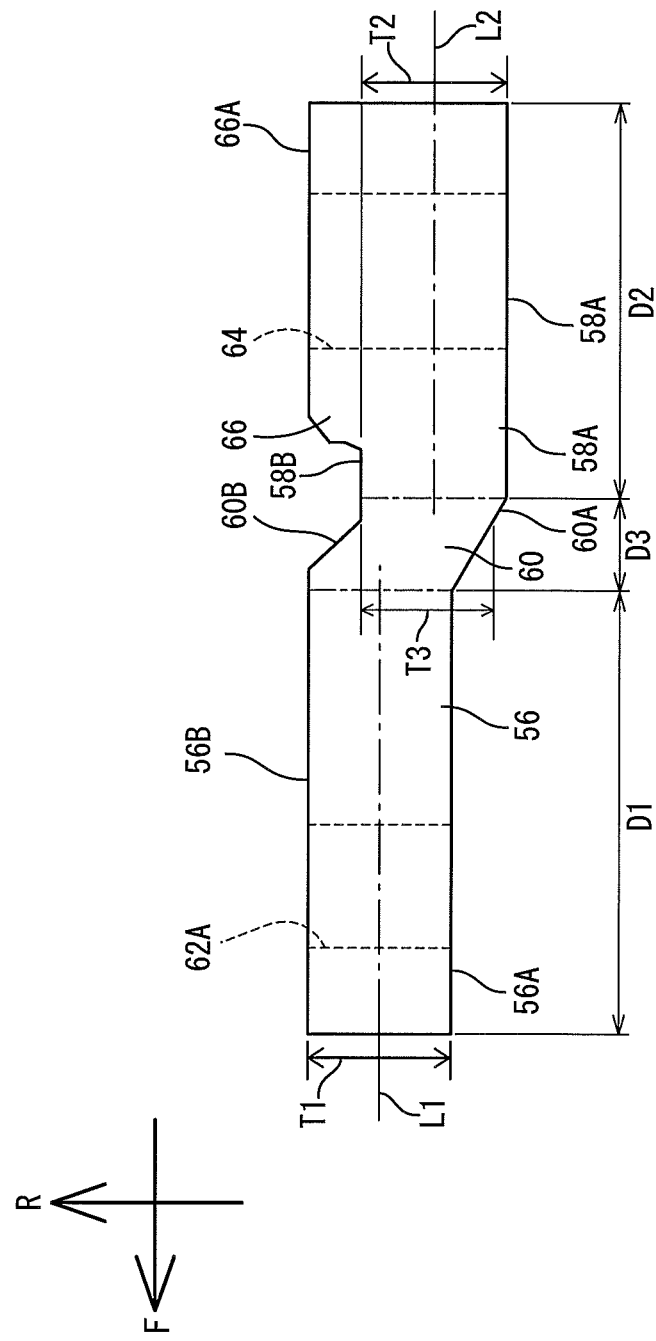
FIG. 4 is a plan view of the bracket of FIG. 3.

Next, the brackets 52 will be described with reference to FIGS. 3 and 4. In the present preferred embodiment, the brackets 52 preferably are in left-right symmetry; thus, in the description below, only the left bracket 52 will be described, and no description of the right bracket 52 will be given. In FIG. 3, arrow F indicates the forward direction with respect to the motorcycle 10, and arrow U the upward direction with respect to the motorcycle 10. In FIG. 4, arrow F indicates the forward direction with respect to the motorcycle 10, and arrow R the right direction with respect to the motorcycle 10.

The bracket 52 may be made of, for example, steel, an aluminum alloy or a magnesium alloy. The bracket 52 includes a first attachment portion 56, a second attachment portion 58 and a coupling portion 60.

The first attachment portion 56 is attached to the down frame 44. The first attachment portion 56 has a thickness, T1, as measured in a vehicle width direction. The first attachment portion 56 extends in a front-to-rear direction, maintaining a constant or substantially constant thickness, T1.

The first attachment portion 56 includes an end surface 56A and an end surface 56B that defines and serves as the first joining surface. The end surface 56A is spaced apart from the end surface 56B in a thickness direction (i.e., in a vehicle width direction). In a plan view of the vehicle, the end surfaces 56A and 56B are parallel or substantially parallel to each other and extend in a front-to-rear direction.

The width of the first attachment portion 56 as measured in a top-to-bottom direction increases toward the front. In the present preferred embodiment, the rate at which the width increases in the upper half of the portion is larger than the rate at which the width increases in the lower half.

A plurality of insertion holes 62A and 62B (for example, two holes in the present preferred embodiment) are provided in the first attachment portion 56. The two insertion holes 62A and 62B extend through the first attachment portion 56 in a vehicle width direction. The two insertion holes 62A and 62B are spaced apart in a top-to-bottom direction.

The second attachment portion 58 is attached to the engine 22. In the present preferred embodiment, the second attachment portion 58 is attached to the crankcase 22A. The second attachment portion 58 is located rearward of the first attachment portion 56.

The second attachment portion 58 has a thickness, T2, as measured in a vehicle width direction. The second attachment portion 58 extends in a front-to-rear direction, maintaining a constant or substantially constant thickness, T2. Thickness T2 may be equal to thickness T1 or different from thickness T1.

The second attachment portion 58 includes an end surface 58A and an end surface 58B. The end surface 58A is spaced apart from the end surface 58B in a thickness direction (i.e. in a vehicle width direction). In a plan view of the vehicle, the end surfaces 58A and 58B are parallel or substantially parallel to each other and extend in a front-to-rear direction.

The width of the second attachment portion 58 as measured in a top-to-bottom direction decreases toward the rear. In the present preferred embodiment, the rate at which the width decreases in the upper half of the portion is larger than the rate at which the width decreases in the lower half.

An insertion hole 64 is provided in the second attachment portion 58. The insertion hole 64 extends through the second attachment portion 58 in a thickness direction. As shown in FIG. 3, in a side view of the vehicle, the insertion hole 64 is located between the insertion holes 62A and 62B as measured in a top-to-bottom direction with respect to the vehicle.

The front-to-rear dimension, D2, of the second attachment portion 58 is smaller than the front-to-rear dimension, D1, of the first attachment portion 56.

The second attachment portion 58 is offset relative to the first attachment portion 56 in a vehicle width direction. More specifically, as shown FIG. 4, in a plan view of the vehicle, the end surface 58A is located to the left of the end surface 56A as measured in a vehicle width direction. As shown in FIG. 4, in a plan view of the bracket 52A, the end surface 58B is located to the left of the end surface 56B as measured in a vehicle width direction. The reference line L2 is located to the left of the reference line L1 as measured in a vehicle width direction. The reference line L2 is a direct line passing through the center of the second attachment portion 58 as measured in a vehicle width direction and extending in a front-to-rear direction, while the reference line L1 is a direct line passing through the center of the first attachment portion 56 as measured in a vehicle width direction and extending in a front-to-rear direction. That is, the center of the second attachment portion 58 as measured in a vehicle width direction is located to the left of the center of the first attachment portion 56 as measured in a vehicle width direction.

The second attachment portion 58 includes a projection 66. The projection 66 is provided on the end surface 58B. The projection 66 has an end surface 66A that serves as the second joining surface. As shown in FIG. 4, in a plan view of the vehicle, the end surface 66A generally extends in a front-to-rear direction. As shown in FIG. 4, in a plan view of the vehicle, the end surface 66A is at the same location as the end surface 56B as measured in a vehicle width direction.

The coupling portion 60 is located between the first and second attachment portions 56 and 58 as measured in a front-to-rear direction with respect to the vehicle. The coupling portion 60 couples the first attachment portion 56 with the second attachment portion 58.

In a plan view of the vehicle, the coupling portion 60 extends in a direction different from that of the first and second attachment portions 56 and 58. In a plan view of the vehicle, the coupling portion 60 extends in a direction angled relative to a front-to-rear direction with respect to the vehicle.

The coupling portion 60 has a thickness as measured in a vehicle width direction. The coupling portion 60 has an end surface 60A that serves as the first end surface and an end surface 60B that serves as the second end surface. The end surface 60A is spaced apart from the end surface 60B in a thickness direction (i.e. in a vehicle width direction). In a plan view of the vehicle, the end surface 60A extends in a direction different from that of the end surface 60B.

The front-to-rear dimension, D3, of the coupling portion 60 is smaller than the front-to-rear dimension D1 of the first attachment portion 56 or the front-to-rear dimension D2 of the second attachment portion 58.

Figure 5:
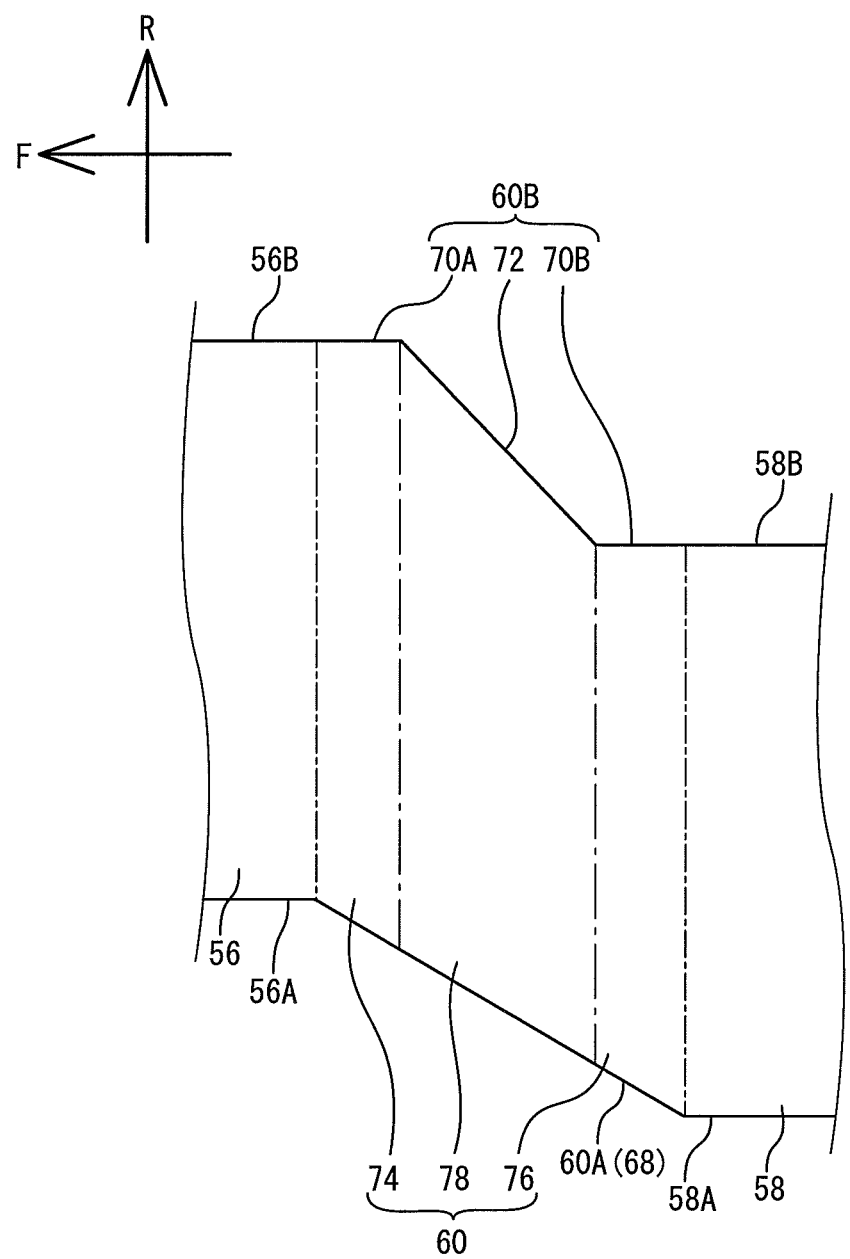
FIG. 5 is an enlarged plan view of the coupling portion of the bracket of FIG. 3.

The end surfaces 60A and 60B will be described with reference to FIG. 5. FIG. 5 is an enlarged plan view of the coupling portion 60. In FIG. 5, arrow F indicates the forward direction with respect to the motorcycle 10, and arrow R the right direction with respect to the motorcycle 10.

In a plan view of the vehicle, the end surface 60A is a slope 68 extending in a direction angled relative to a front-to-rear direction with respect to the vehicle. The end surface 60B includes horizontal surfaces 70A and 70B extending in a front-to-rear direction with respect to the vehicle, and a slope 72 extending in a direction angled relative to a front-to-rear direction with respect to the vehicle.

The horizontal surface 70A is spaced apart from the horizontal surface 70B in a front-to-rear direction. In a plan view of the vehicle, the horizontal surface 70B is located to the left of the horizontal surface 70A as measured in a vehicle width direction. The horizontal surface 70A is smoothly connected with the end surface 56B. The horizontal surface 70B is smoothly connected with the end surface 58B. The slope 72 is connected with the horizontal surfaces 70A and 70B. The slope 72 is non-parallel relative to the slope 68.

The coupling portion 60 includes a front end 74, a rear end 76 and a connection 78. The front end 74 is connected with the first attachment portion 56. The rear end 76 is connected with the second attachment portion 58. The connection 78 is located between the front and rear ends 74 and 76 as measured in a front-to-rear direction with respect to the vehicle. The connection 78 connects the front end 74 with the rear end 76.

The horizontal surface 70A is provided on the front end 74. The horizontal surface 70B is provided on the rear end 76. The slope 68 (i.e., the end surface 60A) overlaps the horizontal surfaces 70A and 70B as viewed in a vehicle width direction.

The thickness of the coupling portion 60 as measured in a vehicle width direction is changed along a front-to-rear direction with respect to the vehicle. The thickness, T3, of the coupling portion 60 as measured in a vehicle width direction is smallest at the interface between the horizontal surface 70B and slope 72. Thickness T3 is smaller than thickness T1 or T2.

Figure 6:
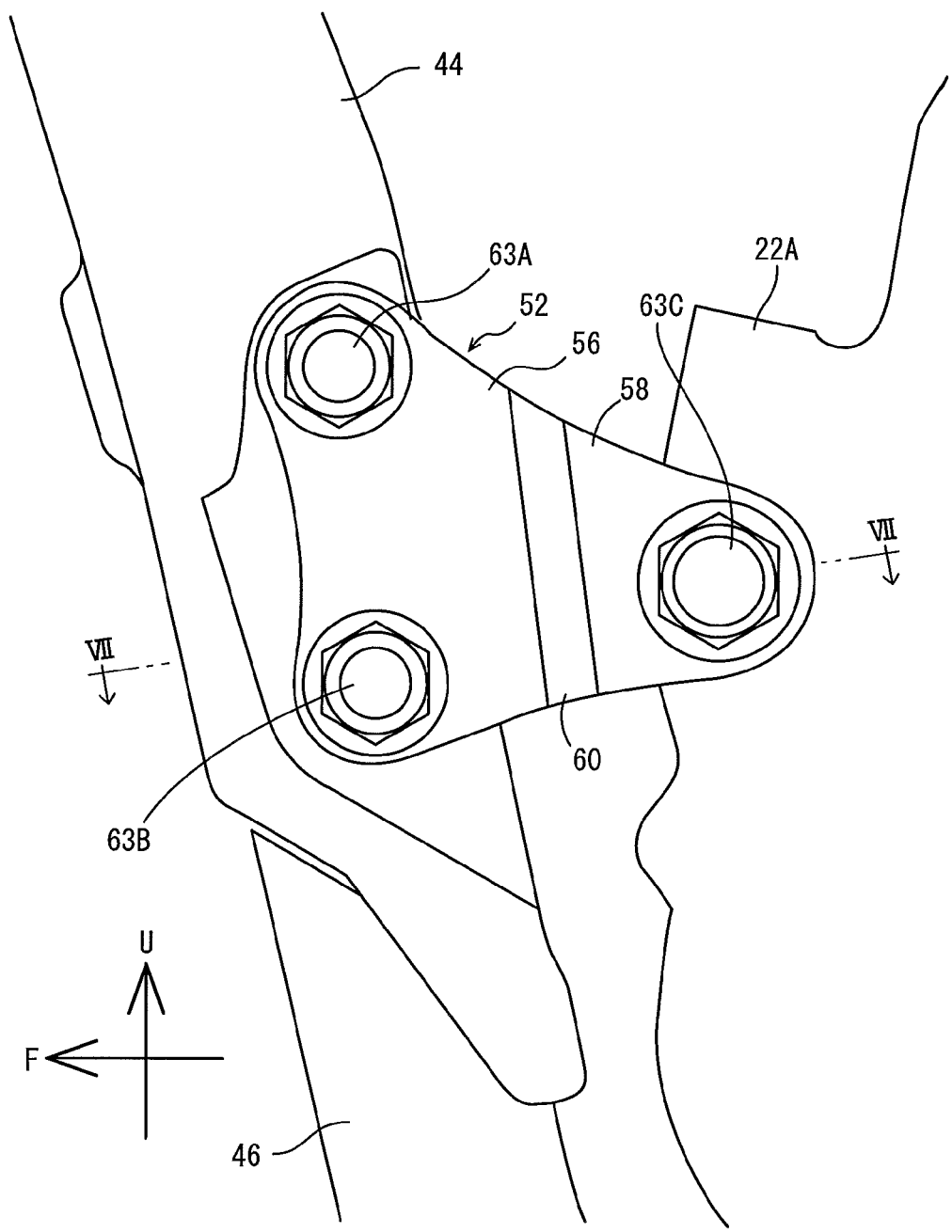
FIG. 6 is a left side view of the bracket of FIG. 3 as coupling the down frame with the engine.
Figure 7:
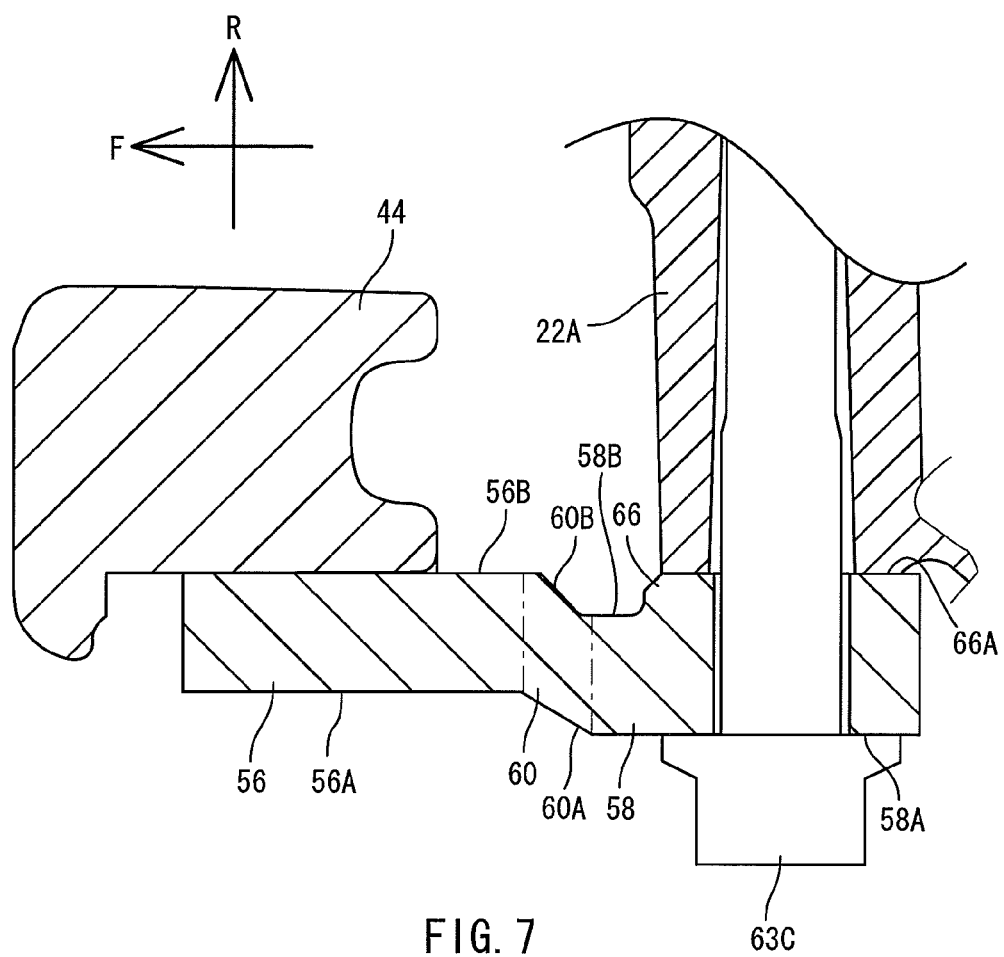
FIG. 7 is a cross-sectional view taken on line VII-VII of FIG. 6.

How the bracket 52 couples the down frame 44 with the engine 22 will be described with reference to FIGS. 6 and 7. In FIG. 6, arrow F indicates the forward direction with respect to the motorcycle 10, and arrow U the upward direction with respect to the motorcycle 10. In FIG. 7, arrow F indicates the forward direction with respect to the motorcycle 10, and arrow R the right direction with respect to the motorcycle 10.

The first attachment portion 56 is attached to the down frame 44 by a bolt 63A, which is inserted through the insertion hole 62A, and a bolt 63B, which is inserted through the insertion hole 62B. As shown in FIG. 7, the first attachment portion 56 overlaps the down frame 44 such that the first attachment portion and down frame are arranged in a vehicle width direction. The end surface 56B is joined to the down frame 44. In other words, the end surface 56B implements the first joining surface.

The second attachment portion 58 is attached to the crankcase 22A by a bolt 63C, which is inserted through the insertion hole 64. The projection 66 overlaps the crankcase 22A such that the projection and crankcase are arranged in a vehicle width direction. The end surface 66A is joined to the crankcase 22A.

As shown in FIG. 2A, in a side view of the vehicle, the second attachment portion 58 is located below a horizontal line, H, which passes through the center of gravity, G, of the engine 22. The center of gravity G of the engine 22 is the center of gravity of not only the engine 22, but of a rigid body including the exhaust pipe 24 connected with the engine 22, the muffler 26 connected with the exhaust pipe 24 and the throttle body 79 connected with the engine 22.

With the first attachment portion 56 attached to the down frame 44 and the second attachment portion 58 attached to the engine 22 in the manner described above, the coupling portion 60 is located between the engine 22 and down frame 44 in a side view of the vehicle.

A motorcycle 10 includes an engine 22, a body frame 12, and a bracket 52. The bracket 52 attaches the engine 22 to the body frame 12. The body frame 12 includes a head pipe 34, a main frame 36, and a down frame 44. The main frame 36 extends rearward from the head pipe 34. The down frame 44 is located forward of the engine 22 and extends in a top-to-bottom direction. The bracket 52 includes a first attachment portion 56, a second attachment portion 58 and a coupling portion 60. The first attachment portion 56 is attached to the down frame 44. The second attachment portion 58 is attached to the engine 22 and is located rearward of the first attachment portion 56. The coupling portion 60 is located between the first and second attachment portions 56 and 58 and couples the first attachment portion 56 with the second attachment portion 58. The first and second attachment portions 56 and 58 extend in a front-to-rear direction with respect to the vehicle. The first attachment portion 56 is offset relative to the second attachment portion 58 in a vehicle width direction. In a plan view of the vehicle, the coupling portion 60 is generally oriented in a front-to-rear direction with respect to the vehicle and extends in a direction different from that of the first and second attachment portions 56 and 58.

The first and second attachment portions 56 and 58 are offset relative to each other in a vehicle width direction. Thus, the rigidity of the bracket in a front-to-rear direction with respect to the vehicle is reduced. As such, for example, an impact load in a front-to-rear direction with respect to the vehicle received when the vehicle travels over an uneven surface is mitigated. On the other hand, the rigidity of the bracket in a direction in which one of the first and second attachment portions 56 and 58 is twisted relative to the other is increased. As such, the engine 22 is stably supported against a twisting load received during cornering, for example. Thus, the bracket possesses the desired properties associated with a front-to-rear direction with respect to the vehicle and a twisting direction at the same time.

The thicknesses of the first attachment portion 56, second attachment portion 58 and coupling portion 60 as measured in a vehicle width direction are configured to be tuned separately. This improves the degree of freedom in tuning.

Tuning the offset of the second attachment portion 58 relative to the first attachment portion 56 tunes the rigidity of the bracket against a received load in a front-to-rear direction with respect to the vehicle. Further, tuning the thickness of the coupling portion 60 as measured in a vehicle width direction tunes the rigidity of the bracket against a received load in a front-to-rear direction with respect to the vehicle. More specifically, reducing the thickness of the coupling portion 60 as measured in a vehicle width direction reduces the rigidity of the bracket against a received load in a front-to-rear direction with respect to the vehicle.

Tuning the offset tunes the rigidity of the bracket against a received load in a twisting direction. More specifically, increasing the offset improves the rigidity of the bracket against a received force in a twisting direction.

In a plan view of the vehicle, the coupling portion 60 extends in a direction angled relative to a front-to-rear direction with respect to the vehicle. Thus, the thickness of the coupling portion 60 preferably is smaller than that of a coupling portion 60 extending in a vehicle width direction. As such, the rigidity of the bracket 52 is capable of being easily tuned.

The first attachment portion 56, second attachment portion 58 and coupling portion 60 each have a thickness as measured in a vehicle width direction. The coupling portion 60 includes a first end surface 60A and a second end surface 60B. The first end surface 60A is located on one of the sides of the coupling portion disposed in a vehicle width direction. The second end surface 60B is located on the other one of the sides of the coupling portion disposed in a vehicle width direction. In a plan view of the vehicle, the first end surface 60A extends in a direction different from that of the second end surface 60B.

Thus, the thickness of the coupling portion 60 as measured in a vehicle width direction is changed along a front-to-rear direction with respect to the vehicle.

In a plan view of the vehicle, the first end surface 60A includes a slope 68 extending in a direction angled relative to a front-to-rear direction with respect to the vehicle. In a plan view of the vehicle, the second end surface 60B includes horizontal surfaces 70A and 70B extending in a front-to-rear direction with respect to the vehicle. The slope 68 overlaps the horizontal surfaces 70A and 70B as viewed in a vehicle width direction.

The thickness of the coupling portion 60 as measured in a vehicle width direction is easily changed.

The coupling portion 60 includes a front end 74 and a rear end 76. The front end 74 is connected with the first attachment portion 56. The rear end 76 is connected with the second attachment portion 58. The horizontal surface 70A is provided on the front end 74. The horizontal surface 70B is provided on the rear end 76.

Thus, the horizontal surfaces 70A and 70B are capable of being easily formed.

The coupling portion 60 includes a portion that has a thickness as measured in a vehicle width direction that is smaller than that of the first and second attachment portions 56 and 58. Thus, the rigidity of the bracket 52 is easily reduced.

The first attachment portion 56 includes a first joining surface 56B. The first joining surface 56B overlaps the down frame 44 such that the joining surface and the down frame are arranged in a vehicle width direction, and is joined to the down frame 44. The second attachment portion 58 includes an end surface 58B and a projection 66. The end surface 58B is located outward of the first joining surface 56B as measured in a vehicle width direction. The projection 66 protrudes from the end surface 58B inward as measured in a vehicle width direction. The projection 66 overlaps the engine 22 such that the projection and the engine are arranged in a vehicle width direction, and is joined to the engine 22.

Thus, the design of the engine 22 need not be changed in order to tune the rigidity of the bracket against a load received.

The engine 22 includes a crankcase 22A. The second attachment portion 58 is attached to the crankcase 22A.

Thus, the bracket 52 is located lower than the center of gravity, G, of the engine 22. Thus, when the vehicle receives a force in a front-to-rear direction with respect to the vehicle, deformation in a twisting direction occurs between center of gravity G and the bracket 52 (more particularly, the portion of the engine 22 to which the second attachment portion 58 is attached). As such, the rigidity of the vehicle as a whole against a received force in a front-to-rear direction with respect to the vehicle is significantly reduced.

Moreover, the distance between the bracket 54 and bracket 52 is increased. This increases the rigidity against a received force in a twisting direction.

In a side view of the vehicle, the second attachment portion 58 is located below a horizontal line, H, that passes through the center of gravity of the engine 22. Thus, the rigidity of the vehicle as a whole against a received force in a front-to-rear direction with respect to the vehicle is reduced.

In the preferred embodiment illustrated above, the slope 72 preferably is parallel or substantially parallel to the slope 68.

In the preferred embodiment illustrated above, only one of the horizontal surfaces 70A and 70B may be provided, or the horizontal surfaces 70A and 70B may not be provided, for example.

In the preferred embodiments described above, the thicknesses of the first and second attachment portions 56 and 58 and coupling portion 60 as measured in a vehicle width direction may be equal or different.

In the preferred embodiments described above, the first attachment portion 56 may be attached to the lower frame 46.

Figure 8:
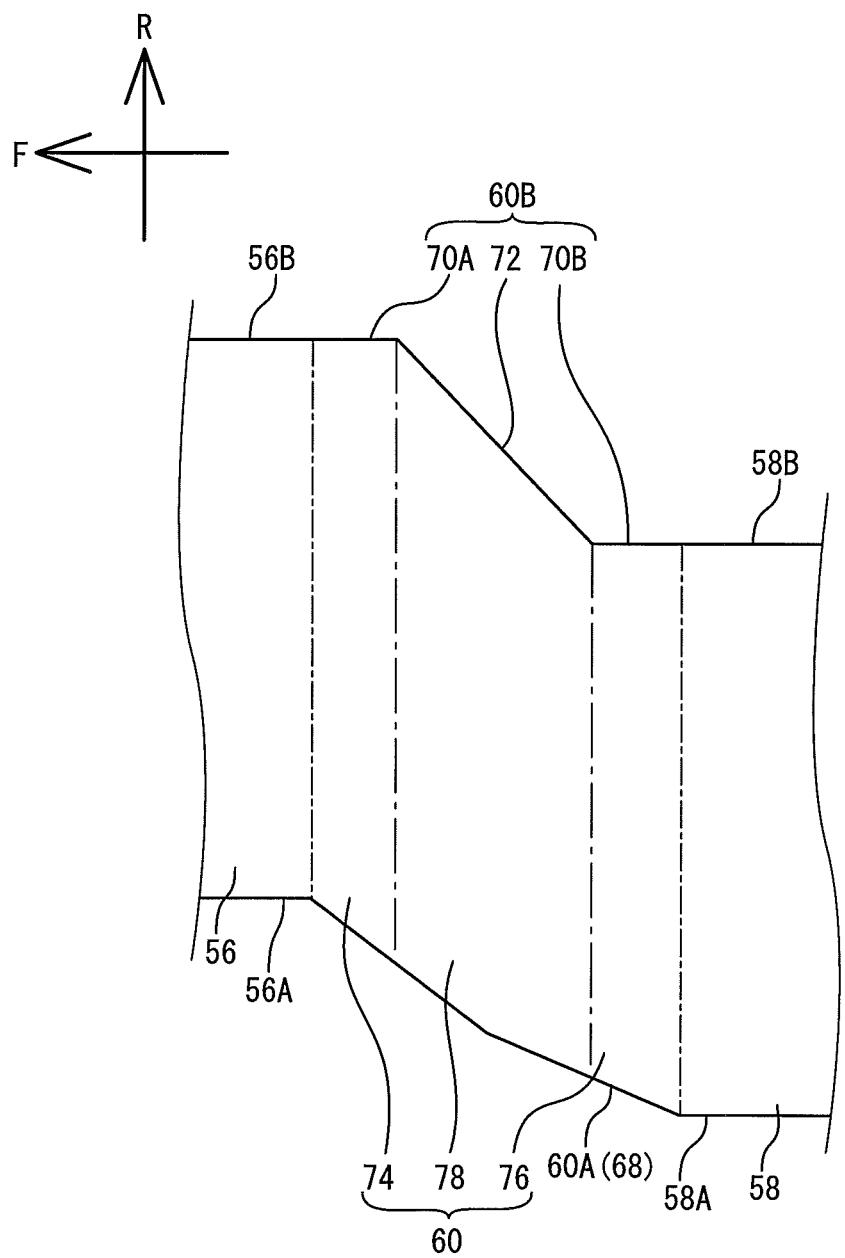
FIG. 8 is an enlarged plan view of a variation of the coupling portion.

In the preferred embodiments described above, the shape of the coupling portion 60 in a plan view of the vehicle is not limited to that shown in FIG. 5. For example, as shown in FIG. 8, the end surface 60A may be bent in a plan view of the vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type vehicle comprising:
    an engine;
    a body frame; and
    a unitary bracket configured to attach the engine to the body frame; wherein
    the body frame includes:
        a head pipe;
        a main frame extending rearward from the head pipe; and
        a down frame located forward of the engine and extending in a top-to-bottom direction;
    the bracket includes:
        a first attachment portion attached to the down frame;
        a second attachment portion attached to the engine and located rearward of the first attachment portion; and
        a coupling portion located between the first and second attachment portions to couple the first attachment portion with the second attachment portion; wherein
        the first and second attachment portions extend in a front-to-rear direction with respect to the vehicle;
        the first attachment portion is offset relative to the second attachment portion in a vehicle width direction; and
        in a plan view of the vehicle, the coupling portion extends substantially in a front-to-rear direction with respect to the vehicle and extends in a direction different from that of the first and second attachment portions;
    the first attachment portion, the second attachment portion, and the coupling portion each have a thickness as measured in the vehicle width direction;
    the coupling portion includes:
        a first end surface located on one side of the coupling portion disposed in the vehicle width direction;
        a second end surface located on the other side of the coupling portion disposed in the vehicle width direction; and
        in a plan view of the vehicle, the first end surface extends in a direction different from that of the second end surface; and
    the thickness of the coupling portion as measured in the vehicle width direction is non-constant throughout an entire length of the coupling portion in the front-to-rear direction with respect to the vehicle.

2. The straddle-type vehicle according to claim 1, wherein, in a plan view of the vehicle, the coupling portion extends in a direction angled relative to the front-to-rear direction with respect to the vehicle.

3. The straddle-type vehicle according to claim 1, wherein,
    in a plan view of the vehicle, the first end surface includes a slope extending in a direction angled relative to the front-to-rear direction with respect to the vehicle;
    in a plan view of the vehicle, the second end surface includes a horizontal surface extending in the front-to-rear direction with respect to the vehicle; and
    the slope overlaps the horizontal surface as viewed in the vehicle width direction.

4. The straddle-type vehicle according to claim 3, wherein the coupling portion includes:
    a front end connected with the first attachment portion;
    a rear end connected with the second attachment portion; wherein
    the horizontal surface is located on at least one of the front and rear ends.

5. The straddle-type vehicle according to claim 1, wherein the coupling portion includes a portion that has a thickness as measured in the vehicle width direction that is smaller than that of the first and second attachment portions.

6. The straddle-type vehicle according to claim 1, wherein the first attachment portion includes a first joining surface overlapping the down frame such that the joining surface and the down frame are arranged in the vehicle width direction, and joined to the down frame;

the second attachment portion includes:
an end surface located outward of the first joining surface in the vehicle width direction; and
a projection protruding from the end surface inward in the vehicle width direction; wherein
the projection includes a second joining surface overlapping the engine such that the projection and the engine are arranged in the vehicle width direction, and joined to the engine.

7. The straddle-type vehicle according to claim 1, wherein the engine includes a crankcase; and
the second attachment portion is attached to the crankcase.

8. The straddle-type vehicle according to claim 7, wherein, in a side view of the vehicle, the second attachment portion is located below a horizontal line that passes through a center of gravity of the engine.

9. The straddle-type vehicle according to claim 1, wherein,
in a side view of the vehicle, the coupling portion is located between the engine and the down frame;
a plurality of first insertion holes are provided in the first attachment portion; a bolt is inserted through each of the plurality of first insertion holes to attach the first attachment portion to the down frame;
a second insertion hole is provided in the second attachment portion;
a bolt is inserted through the second insertion hole to attach the second attachment portion to the engine;
the plurality of first insertion holes are arranged in the top-to-bottom direction; and
in the side view of the vehicle, the second insertion hole is located, as measured in the top-to-bottom direction with respect to the vehicle, between an uppermost one of the plurality of first insertion holes and a lowermost one of the plurality of first insertion holes.

10. The straddle-type vehicle according to claim 1, wherein the coupling portion includes:
a first portion; and
a second portion connected to the first portion, the first and second portions arranged in the front-to-rear direction with respect to the vehicle; and
a thickness of the first portion varies at a rate that is different from a thickness of the second portion.

11. The straddle-type vehicle according to claim 1, wherein the coupling portion includes a portion having a thickness that is smaller than a portion of the coupling portion coupled to the first attachment portion and smaller than a portion of the coupling portion coupled to the second attachment portion.

12. The straddle-type vehicle according to claim 1, wherein a length of the coupling portion as measured in the front-to-rear direction with respect to the vehicle is smaller than a length of the first and second attachment portions as measured in the front-to-rear direction with respect to the vehicle.

13. The straddle-type vehicle according to claim 1, wherein the first end surface includes a first slope extending in a direction angled relative to the front-to-rear direction with respect to the vehicle;
a front end of the first slope is located closer to the other side of the coupling portion than a rear end of the first slope as measured in the vehicle width direction;
the second end surface includes a second slope extending in a direction that is angled relative to the front-to-rear direction with respect to the vehicle and that is different from the first slope; and
a front end of the second slope extends in a direction toward the other side of the coupling portion farther than a rear end of the second slope extends in the direction toward the other side of the coupling portion, as measured in the vehicle width direction.

* * * * *